(12) United States Patent
Lane et al.

(10) Patent No.: US 8,231,271 B2
(45) Date of Patent: Jul. 31, 2012

(54) IR THERMOMETRY PROBE COVER

(75) Inventors: John A. Lane, Weedsport, NY (US); David E. Quinn, Auburn, NY (US); Ray D. Stone, Camillus, NY (US); Scott A. Martin, Warners, NY (US); John R. Strom, Moravia, NY (US)

(73) Assignee: Welch Allyn, Inc., Skaneateles Falls, NY (US)

(*) Notice: Subject to any disclaimer, the term of this patent is extended or adjusted under 35 U.S.C. 154(b) by 558 days.

(21) Appl. No.: 12/420,926

(22) Filed: Apr. 9, 2009

(65) Prior Publication Data
US 2010/0260230 A1 Oct. 14, 2010

(51) Int. Cl.
*G01K 1/08* (2006.01)

(52) U.S. Cl. ........ 374/158; 374/209; 374/163; 374/141; 374/121; 600/184

(58) Field of Classification Search ................. 374/209, 374/158, 100, 163, 183, 120, 121, 141
See application file for complete search history.

(56) References Cited

U.S. PATENT DOCUMENTS

| | | | |
|---|---|---|---|
| 3,110,304 A | 11/1963 | Hartman | |
| 3,929,018 A * | 12/1975 | Turner | 374/158 |
| 3,987,899 A * | 10/1976 | Vyprachticky | 374/209 |
| 4,380,998 A | 4/1983 | Kieffer, III et al. | |
| 4,662,360 A | 5/1987 | O'Hara et al. | |
| 4,784,149 A | 11/1988 | Berman et al. | |
| 4,863,281 A * | 9/1989 | Suszynski | 374/158 |
| 5,066,142 A | 11/1991 | DeFrank et al. | |
| 5,088,834 A | 2/1992 | Howe et al. | |
| 5,163,418 A | 11/1992 | Fraden et al. | |
| 5,176,630 A | 1/1993 | Shilling et al. | |
| 5,293,862 A | 3/1994 | O'Hara et al. | |
| 5,390,663 A | 2/1995 | Schaefer | |
| 5,403,286 A | 4/1995 | Lockwood, Jr. | |
| 5,411,032 A | 5/1995 | Esseff et al. | |
| 5,516,010 A | 5/1996 | O'Hara et al. | |
| 5,588,748 A | 12/1996 | Nomura et al. | |
| 5,645,350 A | 7/1997 | Jang | |
| 5,707,343 A | 1/1998 | O'Hara et al. | |
| 5,795,067 A | 8/1998 | Fraden et al. | |
| 5,893,833 A | 4/1999 | Pompei et al. | |
| 5,968,458 A | 10/1999 | Shaikho | |
| 5,980,451 A | 11/1999 | O'Hara et al. | |

(Continued)

FOREIGN PATENT DOCUMENTS

EP 1 262 753 A1 12/2002

(Continued)

OTHER PUBLICATIONS

U.S. Appl. No. 11/678,357, filed Feb. 23, 2007, Huerter.

(Continued)

*Primary Examiner* — Gail Verbitsky (57) ABSTRACT

A removable protective cover for an insertion probe of a medical instrument. The cover contains a flexible tubular body that compliments the probe geometry and a radially disposed flange that surrounds the proximal end of the body. A series of snap-on fasteners removably connect the cover to the instrument. A camming surface is located on the outer face of the flange which coacts with a cam follower that is movably mounted upon the instrument to flex the cover sufficiently to open the fastener and release the cover from the instrument and move the cover axially toward the distal end of the tip.

27 Claims, 7 Drawing Sheets

U.S. PATENT DOCUMENTS

| | | | |
|---|---|---|---|
| 6,022,140 A * | 2/2000 | Fraden et al. | 374/158 |
| 6,053,875 A | 4/2000 | Rosenbaum et al. | |
| 6,123,454 A | 9/2000 | Canfield et al. | |
| 6,129,673 A | 10/2000 | Fraden | |
| 6,139,182 A | 10/2000 | Levatter et al. | |
| 6,142,934 A | 11/2000 | Lagerway et al. | |
| 6,152,596 A | 11/2000 | Fraden | |
| 6,155,987 A | 12/2000 | Scherl | |
| 6,224,256 B1 * | 5/2001 | Bala | 374/158 |
| 6,254,271 B1 * | 7/2001 | Lin | 374/158 |
| 6,332,090 B1 * | 12/2001 | DeFrank et al. | 600/474 |
| 6,347,243 B1 | 2/2002 | Fraden | |
| 6,367,973 B2 | 4/2002 | Yamaka | |
| 6,383,133 B1 | 5/2002 | Jones | |
| 6,390,671 B1 | 5/2002 | Tseng | |
| 6,612,735 B2 | 9/2003 | Tomioka et al. | |
| 6,695,474 B2 | 2/2004 | Beerworth et al. | |
| 6,751,497 B2 | 6/2004 | Fraden | |
| 6,786,636 B1 | 9/2004 | Huang et al. | |
| 6,789,936 B1 | 9/2004 | Kraus et al. | |
| 7,037,083 B2 | 5/2006 | O'Neil et al. | |
| 7,083,330 B1 | 8/2006 | Yao | |
| 7,237,949 B2 | 7/2007 | Lantz et al. | |
| 7,494,273 B2 | 2/2009 | Huang et al. | |
| 7,556,424 B2 * | 7/2009 | Walker et al. | 374/158 |
| 7,585,108 B2 | 9/2009 | Chuang et al. | |
| 7,841,767 B2 * | 11/2010 | Harr | 374/121 |
| 2002/0085616 A1 | 7/2002 | Yu | |
| 2002/0163955 A1 | 11/2002 | Yu | |
| 2003/0179809 A1 | 9/2003 | Nakagawa et al. | |
| 2005/0027168 A1 | 2/2005 | Strom et al. | |
| 2005/0027169 A1 | 2/2005 | Goldfain et al. | |
| 2005/0043588 A1 | 2/2005 | Tsai | |
| 2005/0085733 A1 * | 4/2005 | Wong | 600/474 |
| 2006/0020176 A1 | 1/2006 | Berall | |
| 2006/0120432 A1 | 6/2006 | Lantz et al. | |
| 2006/0165152 A1 * | 7/2006 | Walker et al. | 374/158 |
| 2008/0123717 A1 * | 5/2008 | Lane et al. | 374/209 |
| 2008/0203078 A1 | 8/2008 | Huerter | |
| 2009/0129437 A1 * | 5/2009 | Chuang et al. | 374/158 |
| 2011/0134962 A1 * | 6/2011 | Fraden | 374/209 |
| 2011/0257521 A1 * | 10/2011 | Fraden | 600/438 |

FOREIGN PATENT DOCUMENTS

| | | |
|---|---|---|
| EP | 1 857 037 A1 | 11/2007 |
| WO | WO 99/42760 | 8/1999 |
| WO | WO 02/056756 | 7/2002 |
| WO | WO 2010/078219 | 7/2010 |

OTHER PUBLICATIONS

International Search Report, mailed Mar. 10, 2009, PCT/US2008/073956, 4 pages.

Supplemental European Search Report dated Oct. 27, 2010, EP 08798437.3, 7 pages.

International Search Report/Written Opinion for PCT Application No. PCT/US2010/030233; mailed Jun. 17, 2010; 9 pages.

* cited by examiner

IR THERMOMETRY PROBE COVER

FIELD OF THE INVENTION

This invention relates generally to a protective cover for the probe of a medical instrument that is insertable into a body cavity.

BACKGROUND OF THE INVENTION

Many types of medical instruments, such as an infrared (IR) thermometer, contain a probe for insertion into a body cavity so that various body related measurement can be taken. In order to prevent cross contamination between patients or health care workers and patients, the probe is generally enclosed within a protective cover which can be disposed of in a sanitary manner after it has been used. Typically the covers are manufacted of plastic using different types of molding techniques many of which produce products that have surface imperfections or which can not be held to tight tolerances. Most protective covers are packaged and shipped with the covers being stacked one inside the other. Unstacking irregular formed covers and placing them upon the tip of an instrument can be extremely difficult. Defective covers tend to bind in the stack and as a consequence can be damaged and dropped during removal from the stack. Displacement or a misshapened cover from the instrument tip during an examination can also be unnerving to both the attending health care individuals and the patient. Lastly, an irregular formed covers can hang up on the instrument during removal thus requiring unwanted manual handling of a potentially contaminated product.

SUMMARY OF THE INVENTION

It is therefore a primary object of this invention to improve disposable probe covers that are suitable for use in the protection of insertion tips of medical instruments.

Another object of the invention is to provide for easy removal of a protective probe cover from a supply stack of covers.

A further object of the invention is to more positively secure a protective probe cover to a medical instrument to insure that the cover does not become dislodged during a patient examination.

A still further object of the present invention is to allow for the free release of a used probe cover from a medical instrument.

Yet another object of the present invention is to minimize the amount of manual handling that is required when loading and unloading a protective probe cover from a medical instrument.

Still another object of the present invention is to minimize the risk of damaging a protective probe cover as the cover is being loaded upon a medical instrument.

These and other objects of the invention are attained by a removable protective cover for a medical instrument that contains a probe that is suitable for insertion into a body cavity. The cover contains a flexible tubular body that compliments the tip geometry and a radially disposed flange that surround the proximal end of the body. A series of snap on fasteners removably connect the cover to the instrument. A camming surface is located on the outer face of the flange which coacts with a cam follower that is movably mounted upon the instrument to flex the cover sufficiently to open the fastener and release the cover from the instrument. Alignment tabs are further provided on the flange that mate with openings in the instrument to properly register the cover with regard to the instrument.

BRIEF DESCRIPTION OF THE DRAWINGS

For a better understanding of these and other objects of the invention, reference will be made to the following detailed description of the invention which is to be read in association with the accompanying drawings, wherein.

DESCRIPTION OF THE INVENTION

Figure 1:
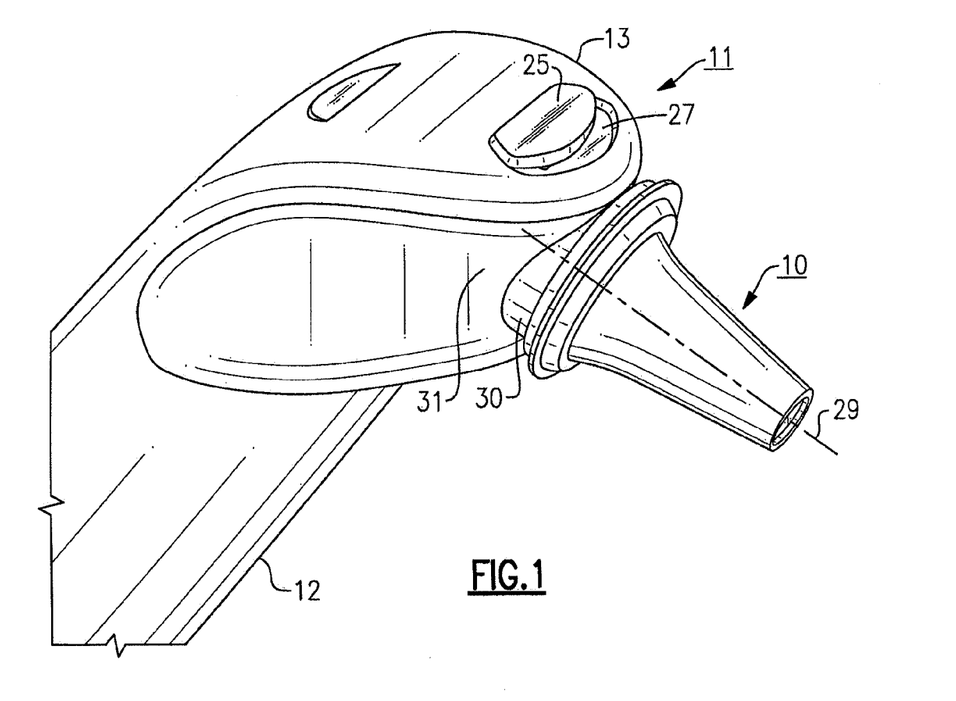
FIG. 1 is a partial view in perspective illustrating the probe end of a medical instrument showing a protective cover embodying the invention securely affixed to the instrument.
Figure 2:
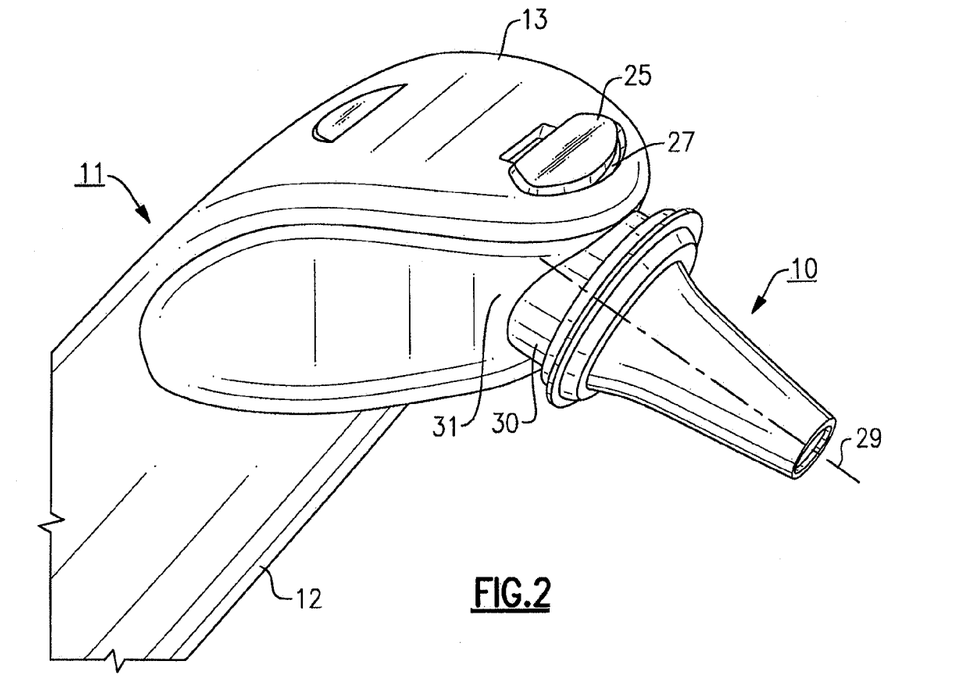
FIG. 2 is a perspective view similar to that illustrated in FIG. 1. showing the protective cover moved to a release position.
Figure 3:
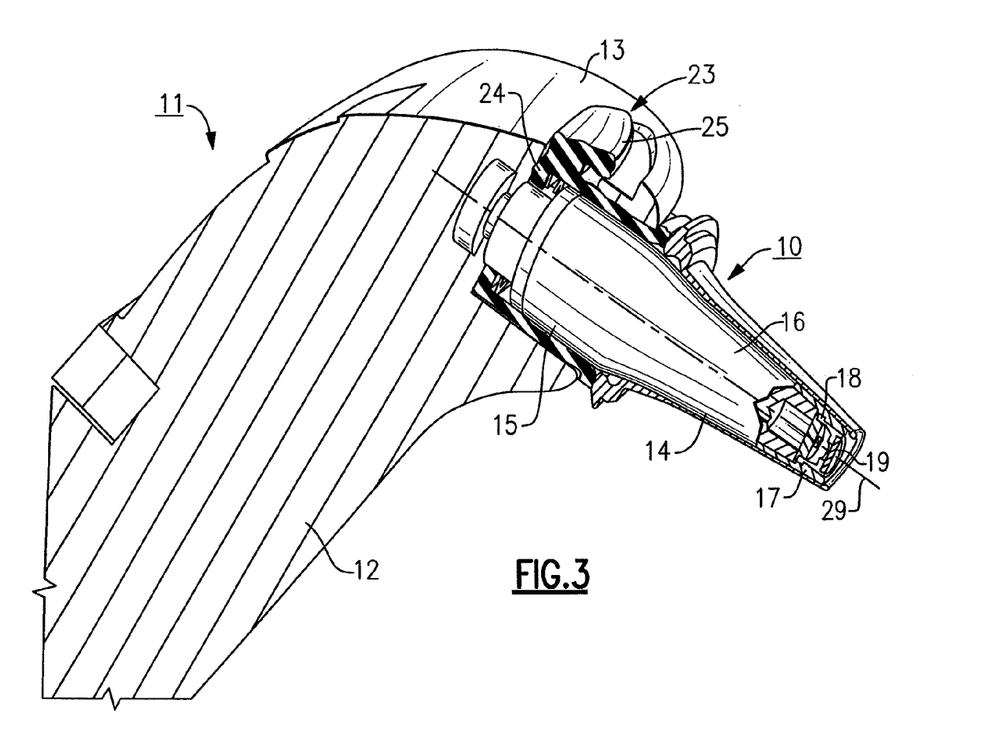
FIG. 3 is a further perspective view of the probe end of an IR thermometer with portion broken away to show the apparatus of the invention in greater detail.

Referring initially to FIGS. 1-3, the present invention involving a protective probe cover generally referenced 10 that will be described herein with regard to an infrared thermometer 11. It should be clear to one skilled in the art, however, that the present invention can be used in conjunction with various other medical instruments having an extended probe for insertion into a body cavity. As pointed out above, disposable protective covers are placed over the probes to mitigate the danger of cross contamination occurring during and after an examination. The covers found in the prior art are typically made of plastic and are fabricated using various molding processes. Many of these molding methods, however, create imperfections in the final product and are unable to hold the product to close tolerances. Resulting in unwanted and potentially dangerous problems arising particularly during a medical procedure.

Testing has shown that probe covers that are fabricated by the injection molding process can be held to tight tolerances while still having a desired amount of flexibility that help overcome many fabrication problems. Accordingly, any references made herein involving a protective probe cover embodying the present invention will be specifically directed to a plastic cover that has been injection molded.

FIGS. 1-3 illustrate the top section of a hand held IR thermometer. The instrument includes a lower body section 12 and an upper head section 13 that contains an insertion probe 10. That protrudes outwardly some distance from the head of the instrument. As best illustrated in FIG. 3, the proximal end section 15 of the probe is cylindrical in form and is secured by any suitable means to the head. The distal end 16 of the probe projects outwardly from the head and is conical shaped so as to taper downwardly from the cylindrical body of the probe towards the distal end tip 17. An IR sensor 18 is mounted in the tip of the probe. Although not shown, the sensor is connected by electrical leads to a processor that is located within the body of the instrument which provides an accurate temperature read out to the user.

The probe cover 10 is shown in FIGS. 1 and 3 mounted upon the extended end of the probe 10 in a locked position wherein the cover is securely fastened to the probe. The inner wall surface 32 of the cover complement the conical wall surface of probe. As will be explained in further detail below, the cover is releasably secured to the probe by a series of snap-on fasteners 50. A best illustrated in FIG. 3, an ejector mechanism, generally referenced 25 is slidably mounted inside the instrument head upon the cylindrical section of the probe. The ejector mechanism is equipped with a circular ring 24 that surrounds the cylindrical section of the probe to provide a close running fit there between so that the ejector can be moved axially along the centerline 29 of the probe between a first cover locking position and a second cover releasing position.

The ring of the ejector contains a raised finger engagable control button 26 that passes upwardly through an opening 27 contained in the head of the instrument. When the control button is situated at the back of the opening as shown in FIG. 1, the ejector mechanism is in the first probe locking position. Manual movement of the control button to the front of the opening as illustrated in FIG. 2 places the ejector mechanism a second probe releasing position.

Figure 4:
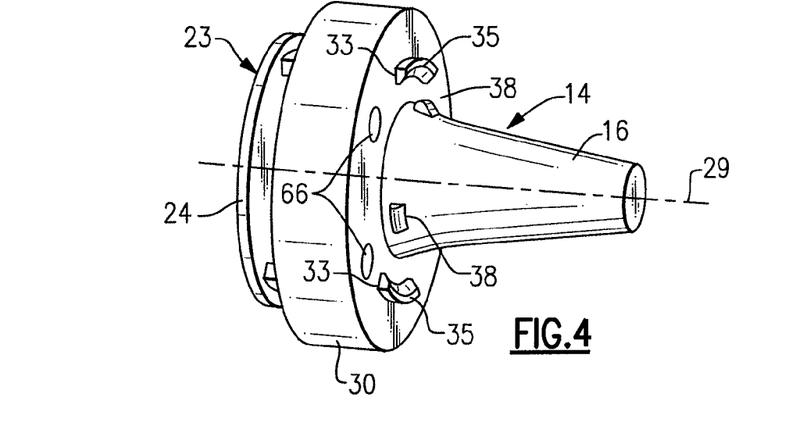
FIG. 4 is a prospective view of the tip end of probe for use in a medical instrument embodying the present invention with the protective cover removed.
Figure 5:
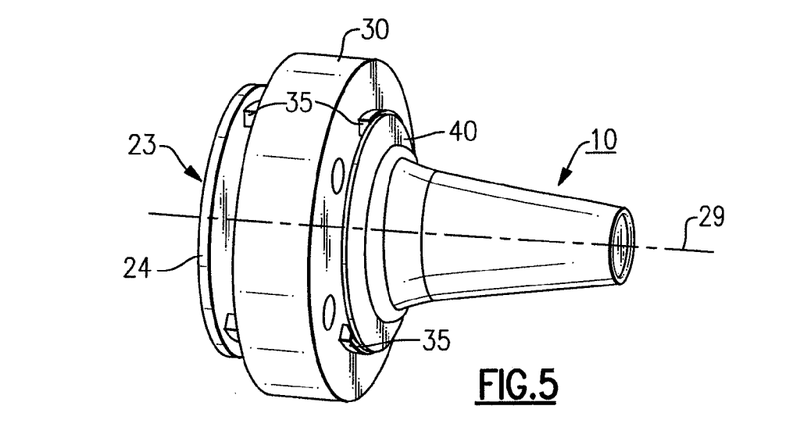
FIG. 5 is a prospective view similar to that illustrated in FIG. 4 showing a protective cover mounted upon the probe tip in an unsecured condition.
Figure 6:
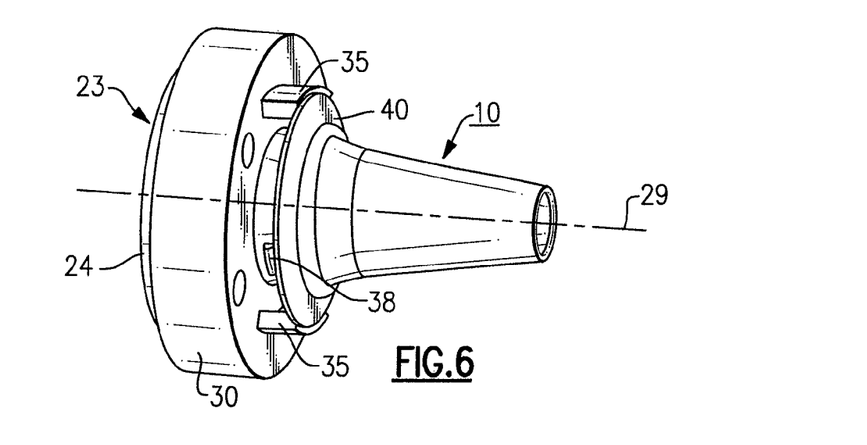
FIG. 6 is a prospective view similar to that shown in FIG. 5 with the cover secured to the tip of the instrument probe.

Turning now to FIGS. 4-6 there is illustrated the front circular shoulder mount 30 of the probe assembly which is retained within the front wall 31 of the instrument head to support the distal end 16 of the probe in assembly. FIG. 4 shows probe without a cover. Two opposed arcute shaped slots 33-33 are located in the probe mount 30 that are centered upon the longitudinal axis 29 of the probe. A pair of arcute shaped fingers 35-35 that are intragally joined to the ejector ring 24 and are slidably contained within the slots 33-33. The fingers are arranged to be extended and retracted as the ejector moves between the first and second positions. A series of circumferentially spaced segmented detent beads 38-38 are mounted upon the probe and, as will be explained in greater detail below, each bead section is the male part of a two part snap on fitting for releasably securing the probe cover 10 to the instrument. Preferably three equally spaced fittings are employed to secure the cover to the instruments, however, more or less fittings may be employed depending upon the particular application.

FIG. 5 illustrates a protective cover 10 mounted in a locked position upon the probe. At this time, the flange 40 of the cover has engaged the fingers 35-35 of the ejector mechanism and has moved the ejector back to the cover locking position due to the rearward movement of the cover over the probe. Full reward movement is attained when the snap-on fasteners engage the bead segments on the probe.

FIG. 6 illustrates a probe cover located upon the probe with the ejector mechanism in the cover releasing position. At this time the control button 25 (FIG. 3) has been moved forward causing the ejector mechanism to unlock the fasteners thus releasing the cover. In addition the continued movement of the ejector toward the distal end of the probe frees the cover from the probe.

Figure 7A:
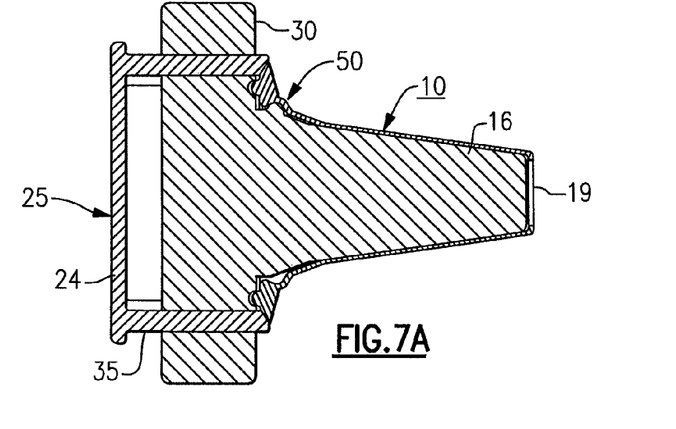
FIG. 7A is a partial view in section showing the probe tip of a medical instrument with a protective cover secured to the instrument in a locked position.
Figure 7B:
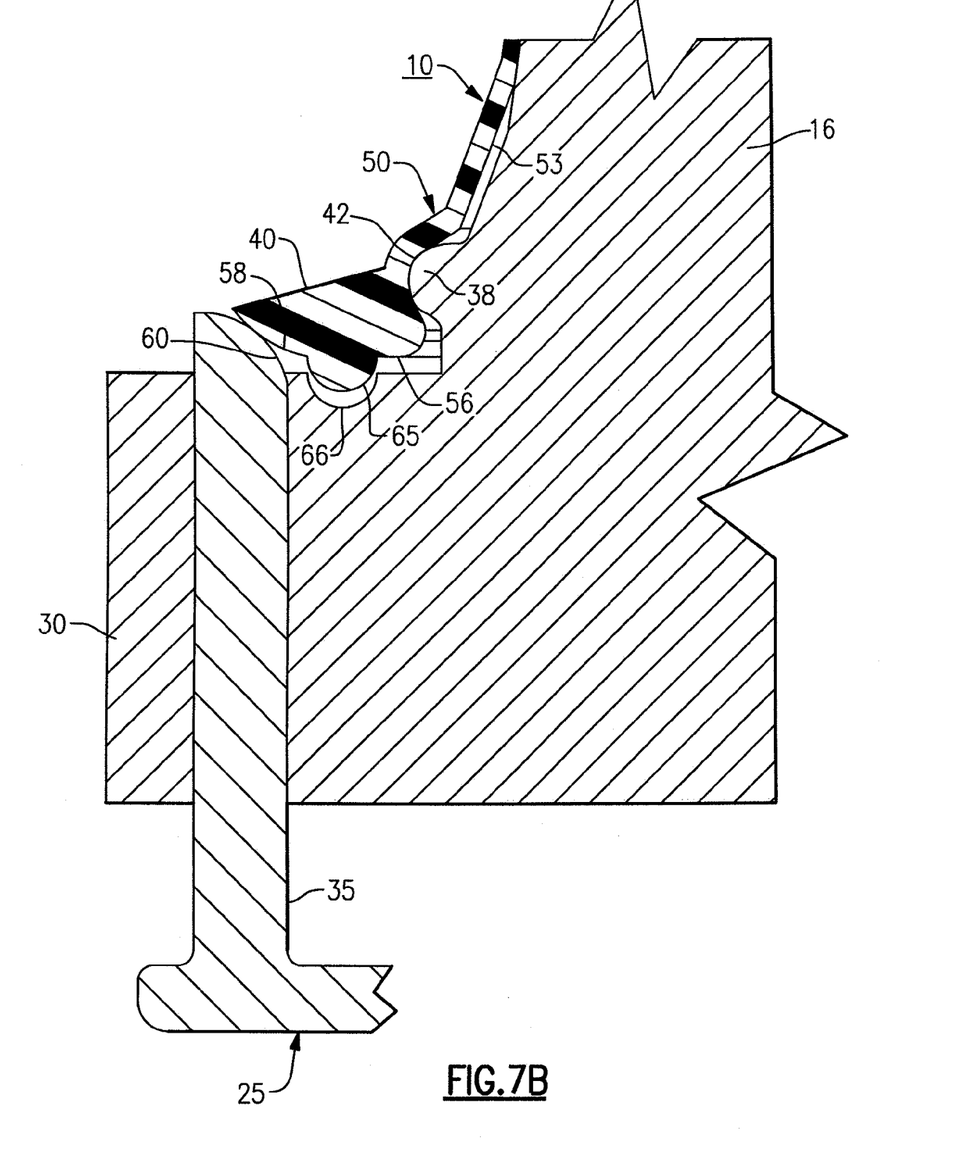
FIG. 7B is an enlarged partial view showing in greater detail one of the snap-on fasteners in a locked position as well as the cover ejector mechanism.
Figure 8:
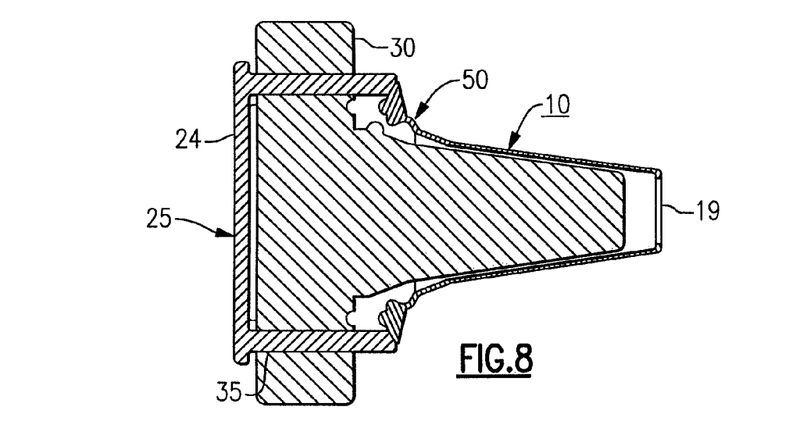
FIG. 8 is a view similar to FIG. 7A showing the ejector mechanism moved to a releasing position.

FIGS. 7A, 7B and 8 illustrate a first embodiment of the invention detailing apparatus for securing and releasing a probe cover from the instrument. FIG. 7A shows the above described ejector mechanism 25 moved back into the first cover locking position and a snap-on fasteners generally reference 50 in a cover securing condition. At this time the cover is snuggly contained upon the probe. The cover contains an IR transparent lens or window 19 mounted in the distal tip thereof which is now located in close proximity with the IR sensor 18 (see FIG. 3).

With further reference to FIG. 7B the securing and releasing apparatus is shown in further detail in the locked position. Each snap-on fastener 50 includes two mating parts or sections. These include the previously noted bead segment 38 located upon the probe surface that mates with an arcuate shaped cove 42 that is contained in the inner wall 53 of the cover adjacent to the proximal end flange 40. The cove preferable extends circularly about the axis of the cover and services each of the detent beads. The cover wall section that encircles the cove provides a weaker section in the cover about which the cover can flex when an upward force is applied to the outer face 56 of the flange. A circular camming surface 58 is contained in the outer face of the flange that rung along the rim of the flange. The camming surface is angularly offset with regard to the axis of the cover. The distal end of the two fingers 35 of the ejector mechanism is provided with a arcute surface 60 that is arranged to ride in contact with camming surface 58 as the ejector mechanism moves between the first and second positions. Surface 60 thus serves as a cam follower in system. Although surface 60 is shown arcute in form, it can, in practice, be a flat surface that rides in sliding contact with camming surface 58 without departing from the teachings of the present invention.

FIG. 7B shows the probe cover 10 in a locked position with the snap fitting closed thereby securing the cover to the probe. At this time the ejector mechanism is in the cover locking position. Moving the ejector button forward moves the cam follower against the camming surface of flange causing the lower portion of the cover to flex about the weakened wall section which surrounds the cove 42. Sufficient flexure is provided to free the detent beads 38 from the cove 42. Thus releasing the cover from the probe. As shown in FIG. 8 further forward movement of the ejector moves the cover well clear of the probe surface so that it can fall easily from probe under the influences of gravity.

A series of semi circular tabs 65 are circumferentially space upon the outer face of the flange that arranged to mate with openings 66 in the raised shoulder 30 of the probe so that the snap-on fittings will mate properly at the time of closure.

Figure 9A:
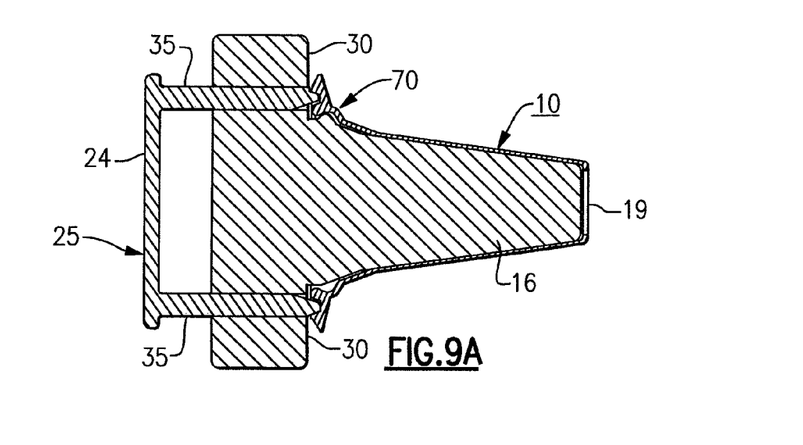
FIG. 9A is a partial view similar to that shown in FIG. 7A showing a second embodiment of the invention with one of the fastener in a locked position.
Figure 9B:
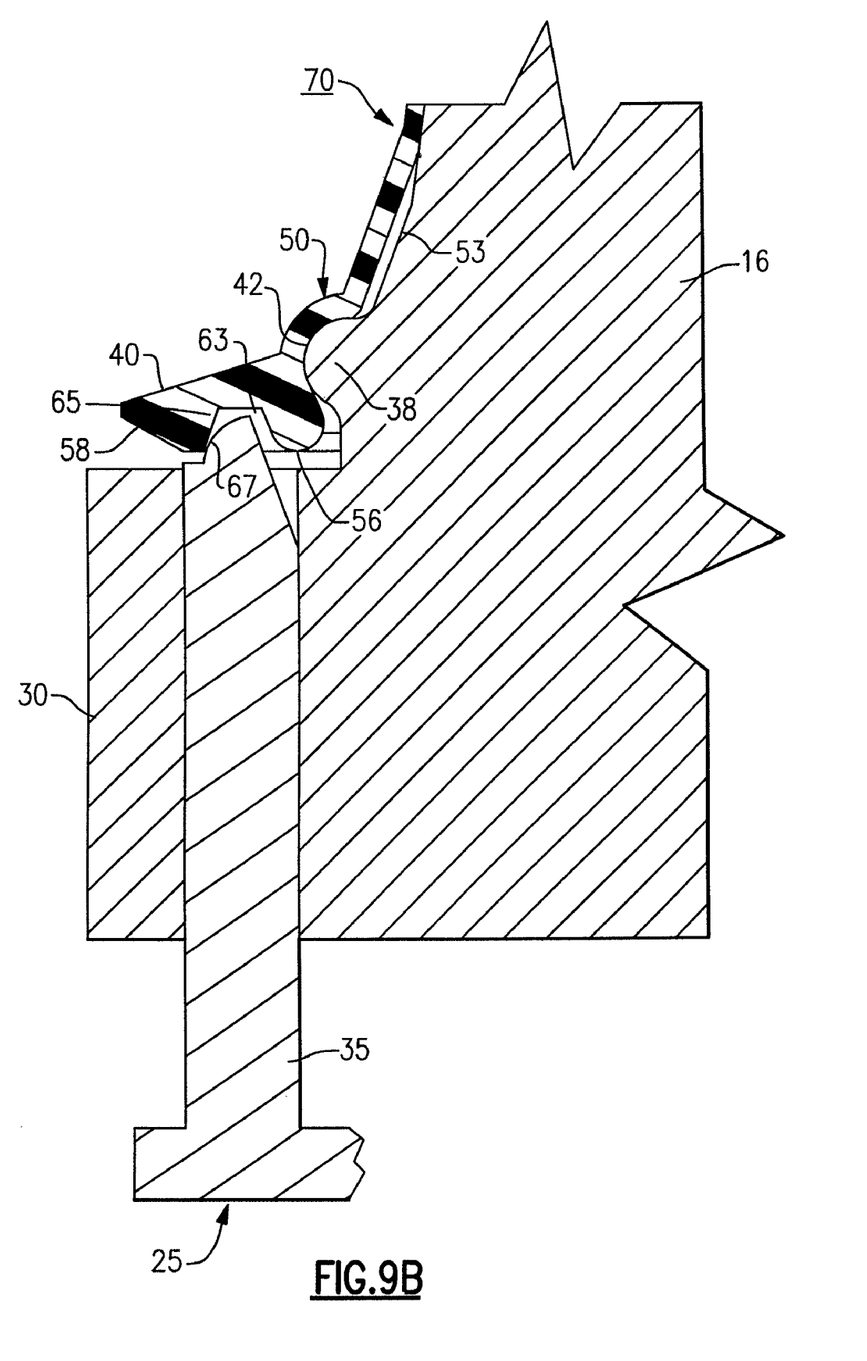
FIG. 9B is an enlarged view showing the snap-on fastener and the ejector mechanism shown in FIG. 9A in greater detail.

Turning now to FIGS. 9A and 9B, there is illustrated a second embodiment of the invention in which the probe cover is generally referenced 70. In this embodiment, the probe cover is also equipped with a series of snap-on fittings 50 as described above. The cove that is formed in the inner wall of the cover body adjacent to the flange is also provided with a weakened section about which the flange can flex. A circular groove 63 is provided in the outer face of the flange which contain a camming surface 65 that is angularly offset with regard to the longitudinal axis of the probe. The end 67 of each ejector mechanism finger 35 is arcuate shaped and acts as a cam followers that ride in sliding contact with the camming surface 65. Again, as the ejector is moved from the first cover locking position to the second release position, each snap on fitting 50 is opened and the cover is released from the probe.

Figure 10:
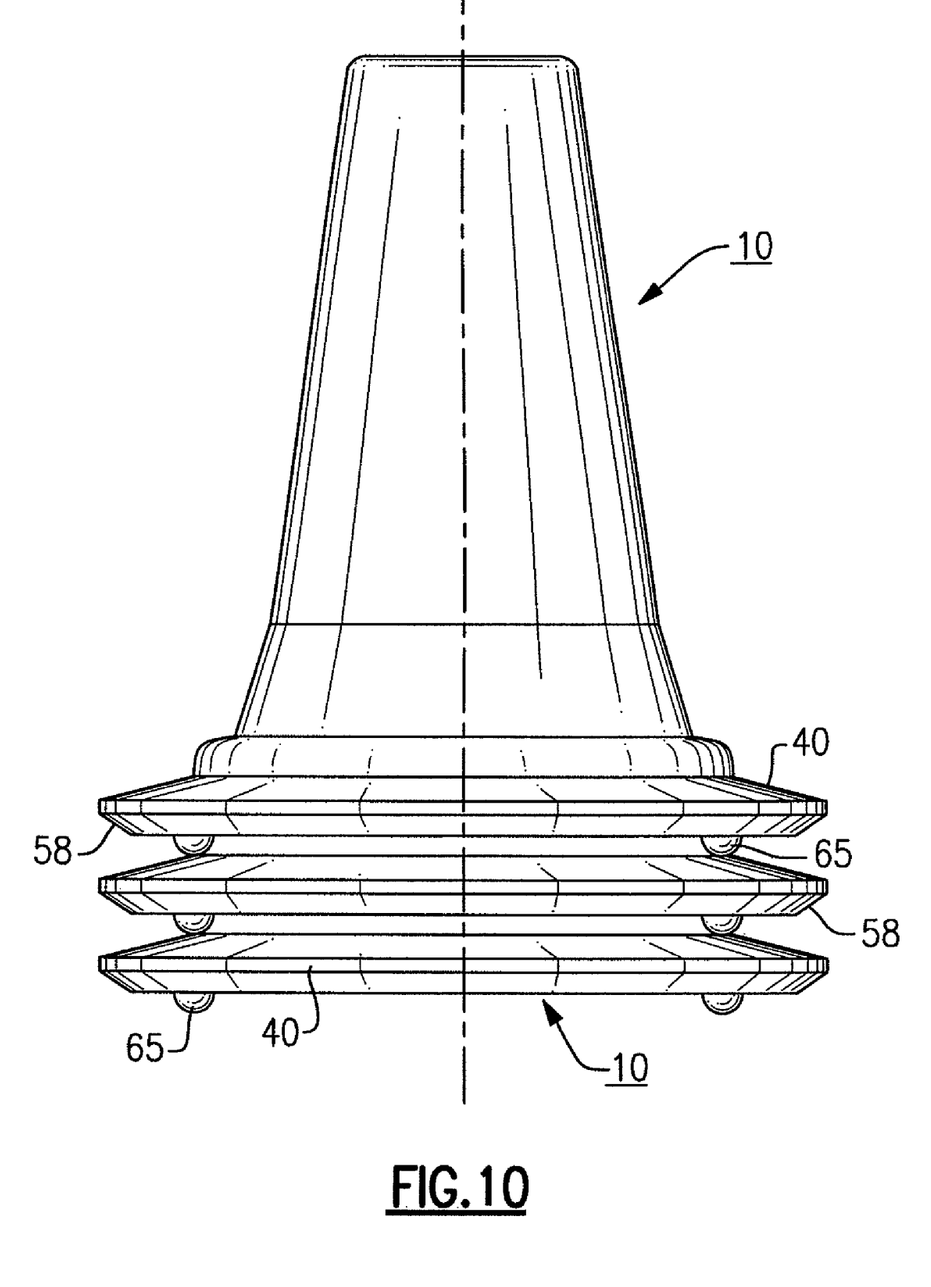
FIG. 10 is an enlarged view illustrating a number of protective covers stacked one inside the other.

As noted, it is the general practice to package and ship the covers in stacks. A number of probe covers 10-10 are illustrated in FIG. 10 in a stacked configuration. When stacked one on top of the other the semi circular tabs on the upper cover are arrange to seat upon the flange of the underlying cover to prevent the outer wall surface of the lower cover from moving into binding contact with the inner surface of the upper cover. In addition, the inclined edge surfaces 58 on the outer face of cover flange 40 provide an easily accessible space between each of the cover which can be utilized to further facilitate removal of individual covers from the stack.

While the invention has been described with reference to a preferred embodiment, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. Apparatus for protectively covering the insertion probe of a medical instrument that includes:
    a cover having a flexible tubular body that compliments the shape of said instrument probe, said body having a distal end, a proximal end and a longitudinal axis,
    a radially disposed flange located at the proximal end of said body, said flange having an outer face that is perpendicular to said longitudinal axis,
    securing means for releasable connecting said body to said instrument, said securing means comprising a first component on said instrument, and a second component on said body and configured to receive said first component,
    a inclined camming surface located upon said outer face of said flange that is angularly offset with regard to said longitudinal axis, and
    an ejector mechanism located upon said instrument for movement along a path of travel parallel to said longitudinal axis, said ejector mechanism containing a cam follower slidably engaging said camming surface to flex said body sufficiently to release said cover from said instrument as said ejector mechanism moves between a first locking position and a second release position.

2. The apparatus of claim 1 wherein said camming surface is formed along the outer edge of said flange.

3. The apparatus of claim 1 wherein said securing means includes a series of circumferentially spaced snap-on fittings.

4. The apparatus of claim 3 wherein each of said snap-on fittings includes a bead segment located upon said instrument that is releasably receivable within an arcuate shaped cove located in said body.

5. The apparatus of claim 4 wherein said cove encircles said longitudinal axis of said cover.

6. The apparatus of claim 5 wherein said cover wall surrounding said arcuate shaped cove provides a section about which said cover is able to flex, wherein the section is weaker than a remainder of the cover wall.

7. The apparatus of claim 1 that further includes aligning means for registering said cover upon said instrument.

8. The apparatus of claim 7 wherein said aligning means includes a series of a spaced apart raised tabs located upon said outer face of said flange that mates with openings in said instrument.

9. The apparatus of claim 1 wherein said cover is fabricated of an injection molded plastic.

10. The apparatus of claim 1 that further includes an infrared transparent lens that is mounted in the distal end of said body.

11. The cover of claim 1 wherein said ejector mechanism is manually operated.

12. The apparatus of claim 1, wherein when the ejector mechanism is in the second release position, the ejector mechanism is fully extended and remains proximal to a distal end of said instrument probe.

13. Apparatus for protectively covering the insertion probe of a medical instrument that includes:
    a cover having a flexible tubular body that compliments the shape of said instrument probe, said body having a distal end, a proximal end and a longitudinal axis,
    a radially disposed flange at said proximal end of said body, said flange having an outer face that is perpendicular to said longitudinal axis,
    securing means for releasably connecting said body to said instrument, said securing means including a series of spaced apart snap-on fittings having a first component on said instrument, and a second component on said body and configured to receive said first component,
    an ejector mechanism mounted upon said instrument for movement along a path of travel that is parallel to said longitudinal axis, said ejector mechanism having at least one cam follower that rides in sliding contact with a camming surface located on the outer face of said flange and which is angularly offset with regard to said longitudinal axis for flexing said body sufficiently to release said securing means, and
    said camming surface is one side wall of a circular groove that is formed in said outer face of said flange.

14. The apparatus of claim 13 wherein each snap-on fitting includes a bead segment that is located upon said instrument and is releasably received within an arcuate shaped cove contained within said body, said cove circumscribing said longitudinal axis.

15. The apparatus of claim 13 wherein the cover wall surrounding said cove provides a section about which the cover is able to flex, wherein the section is weaker than a remainder of the cover wall.

16. The apparatus of claim 13 that further includes aligning means for registering said cover upon said instrument.

17. The apparatus of claim 16 wherein said aligning means includes a series of raised spaced apart tabs located upon the outer face of said flange which mate with openings in said instrument.

18. The apparatus of claim 13 wherein said cover is fabricated of an injection molded plastic.

19. The apparatus of claim 13 that further includes an infrared transparent lens that is mounted in the distal end of said body.

20. The apparatus of claim 13 wherein said ejector is manually operated.

21. A removable protective probe cover for a medical instrument that includes: a flexible tubular body having a proximal end, a distal end, and a longitudinal axis;
    a radially disposed flange located at said proximal end of said tubular body, said flange having an outer end face that is perpendicular to said longitudinal axis;

at least one arcuate shaped cove formed in the inner wall of said body adjacent to said flange for mating with a male member located upon said medical instrument for releasably fastening said cover to said instrument;

said inner wall surrounding said cove that provides a section in said cover about which said cover may flex, wherein the section is weaker than a remainder of the inner wall;

a camming surface located upon said outer face of said flange that is angularly offset with regard to said longitudinal axis such that said cover can be flexed about said cove by a cam follower that move in contact with said camming surface along a path of travel that is parallel to said longitudinal axis to release said cover from said medical instrument; and a series of outward protruding tabs on said outer face of said flange for aligning said cover upon said medical instrument.

22. The probe cover of claim 21 wherein said body tapers downwardly and inwardly from said proximal end toward said distal end of said body.

23. The probe cover of claim 22 wherein said camming surface surrounds the outer rim of said flange.

24. The probe cover of claim 22 that further includes a circular groove that surrounds said longitudinal axis, said groove having one side wall that forms said camming surface.

25. The probe cover of claim 21 that further includes a IR transparent lens mounted in the distal end of said body.

26. The probe cover of claim 21 that is fabricated of an injection molded plastic.

27. Apparatus for protectively covering the insertion probe of a medical instrument that includes:

a cover having a flexible tubular body that compliments the shape of said instrument probe, said body having a distal end, a proximal end and a longitudinal axis;

a radially disposed flange located at the proximal end of said of said body, said flange having an outer face that is perpendicular to said longitudinal axis;

securing means for releasably connecting said body to said instrument, said securing means comprising a first component on said instrument, and a second component on said body and configured to receive said first component;

an inclined camming surface located upon said outer face of said flange that is angularly offset with regard to said longitudinal axis;

an ejector mechanism located upon said instrument for movement along a path of travel substantially parallel to said longitudinal axis, said ejector mechanism containing a cam follower for engaging said camming surface to flex said body sufficiently to release said cover from said instrument as said ejector mechanism moves between a first locking position and a second release position; and an aligning means for registering said cover upon said instrument, said aligning means including a series of spaced apart raised tabs located upon said outer surface of said flange that mate with openings on said instrument.

* * * * *

UNITED STATES PATENT AND TRADEMARK OFFICE
CERTIFICATE OF CORRECTION

PATENT NO. : 8,231,271 B2
APPLICATION NO. : 12/420926
DATED : July 31, 2012
INVENTOR(S) : John A. Lane et al.

Page 1 of 1

It is certified that error appears in the above-identified patent and that said Letters Patent is hereby corrected as shown below:

In the Claims

In claim 1, column 5, line 30, "instrument" should read --insertion--.

Signed and Sealed this
Second Day of July, 2013

Teresa Stanek Rea
*Acting Director of the United States Patent and Trademark Office*